United States Patent [19]
Hernqvist

[11] 3,942,062

[45] Mar. 2, 1976

[54] METAL VAPOR LASER DISCHARGE DEVICE

[75] Inventor: Karl Gerhard Hernqvist, Princeton, N.J.

[73] Assignee: RCA Corporation, New York, N.Y.

[22] Filed: Oct. 15, 1974

[21] Appl. No.: 514,935

[52] U.S. Cl. ............... 313/220; 313/15; 331/94.5 G
[51] Int. Cl.² .......................................... H01J 61/30
[58] Field of Search ......... 313/15, 220; 331/94.5 G, 331/94.5 D, 94.5 T

[56] References Cited
UNITED STATES PATENTS

| 2,267,821 | 12/1941 | Elenbaas | 313/15 X |
| 3,363,134 | 1/1968 | Johnson | 313/220 |
| 3,721,846 | 3/1973 | Cohen | 313/15 |
| 3,798,486 | 3/1974 | Hernqvist | 313/220 |

Primary Examiner—R. V. Rolinec
Assistant Examiner—Darwin R. Hostetter
Attorney, Agent, or Firm—Glenn H. Bruestle; George E. Haas

[57] ABSTRACT

A laser device employs two concentric enclosures with rapid pre-heat elements located between the two enclosures. The device contains a vented bore tube, two electrodes, and a metal vapor source within the innermost of the two enclosures.

2 Claims, 2 Drawing Figures

METAL VAPOR LASER DISCHARGE DEVICE

BACKGROUND OF THE INVENTION

The present invention relates to metal-vapor laser discharge devices and more specifically to a discharge device having a rapid starting time and a low cost gas envelope.

Presently such laser devices are constructed with either a single or a double glass envelope as shown in my U.S. Pat. Nos. 3,683,295 and 3,798,486 respectively. Since the metal vapor lasers operate at high temperatures, such as 250° C. to 300° C. for a He-Cd laser, the glass envelope must have high temperature resistivity and low gas permeativity. In addition to the high temperature limiting the type of envelope used, it also causes a substantial delay period while the device is warming up. Normally the heat given off by the vapor discharge is used to heat the device to operating temperature. However, warm up time with this means often requires in excess 30 minutes for the device to reach full power. In an attempt to solve the warm up problems, external heating means have been employed. However, drafts from the external environment would often cause the laser envelope to crack.

These envelopes have had the added disadvantage of being relatively uneconomical to manufacture since the intricate configuration necessitated the use of custom formed enclosures. To facilitate mass production, it is desireable to mount reflectors directly onto the ends of the outermost envelope. However, since this envelope remains at a high temperature during the laser operation, the envelope expands and the reflectors often become misaligned or detuned.

SUMMARY OF THE INVENTION

A metal vapor laser discharge device has an open ended bore tube mounted coaxially within a larger tube. The larger tube contains a source of metalic vapor and has one of two electrodes mounted near its opposite ends. A gas filled envelope encloses at least the portion of the larger tube which surrounds the bore tube.

DETAILED DESCRIPTION OF THE INVENTION

Figure 1:
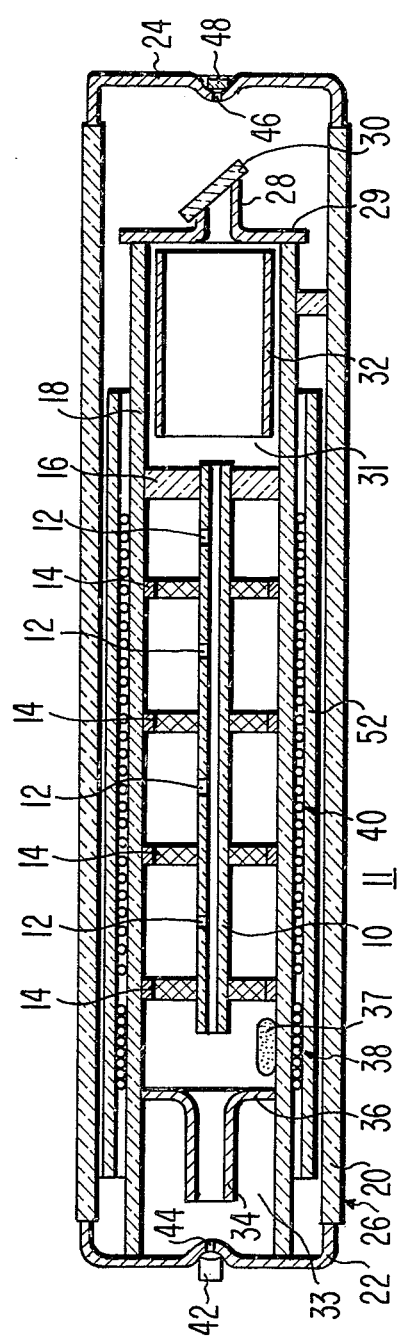
FIG. 1 shows an axial sectional view of one embodiment of the laser discharge device of the present invention.

FIG. 1 shows a laser discharge device, generally designated as 11, comprising a bore tube 10, of a high temperature resistive material such as quartz or high temperature resistive glass, having two open ends and a wall with a plurality of apertures 12 longitudinally spaced along the wall. The bore tube 10 is coaxially mounted within an open ended second tube 18, by means of a plug 16 and a plurality of grid elements 14, which are described in my U.S. Pat. No. 3,683,295. The second tube 18, preferably of high temperature resistive glass, includes a left end portion 33 and a right end portion 31 extending beyond the respective ends of the bore tube 10. The right end portion 31 contains a coaxial cylindrical cathode 32. A short tube 28 has a flange 29 at one end thereof which extends across and is bonded to the right end of the second tube 18. The short tube 28 is in alignment with the bore tube 10 and has a Brewster window 30 positioned over its other end. The left end portion 33 contains a source 37 of a metalic vapor such as cadmium. An internal neck 34 is within the left end portion 33 between the vapor source 37 and the left end of the second tube 18. One end of the neck 34 has a radially outwardly extending flange 36 engaging the interior surface of the second tube 18.

A first heating element 38, such as an electrical heating wire or tape, is wrapped around the second tube 18 in the proximity of the vapor source 37. A second heating element 40, similar to the first element 38, is wrapped around the second tube 18 along the portion of the second tube which surrounds the bore tube 10. An exterior envelope 26, filled with a gas such as helium, encloses the second tube 18 and both heating elements 38 and 40. Both of the electrical heater elements 38 and 40 are connected to an external power supply by means of several leads (not shown) which extend through the envelope 26. The envelope 26 comprises an open ended glass exterior tube 20, coaxially surrounding the second tube 18. A first metal end cap 22 extends across and is bonded to one end of the exterior tube 20. A second metal end cap 24 extends across and is bonded to the other end of the exterior tube 20. The first metal end cap 22 also engages the left end of the second tube 18 and has an aperture 44 therethrough which is aligned with the bore tube 10. A spherical mirror 42 is mounted on the first metal end cap 22 over the aperture 44. The second metal end cap 24 has an aperture 46, aligned with the bore tube 10, over which a mirror 48 is mounted. An insulator 52, such as glass wool, is between the heating elements 38 and 40 and the envelope 26 to provide thermal insulation.

When starting the operation of the laser, a given voltage is applied across the cathode 32 and the first metal end cap 22, which serves as an anode. This voltage establishes an electric field between the anode and the cathode causing a vapor discharge in the bore tube 10 due to the excitation of the gas and the metal vapor. The grid elements 14 and the plug 16 prevent vapor discharge between the bore tube 10 and the second tube 18, as described in my U.S. Pat. No. 3,683,295. The first and second heater elements, 38 and 40 respectively, are also activated. The second heater element 40 is employed to quickly heat interior of the second tube 18 to the required operating temperature. Once this temperature is reached, the second heater element 40 is deactivated and the first heater element 38 remains activated to heat the vapor source 37. The heat from the vapor discharge maintains the operating temperature within the device.

The double enclosure of the bore tube 10 by the second tube 18 and the envelope 26 eliminates the need to use expensive low permeative glass since the envelope 26 remains at a relatively low temperature where gas permeation is minimal. The envelope 26 also protects the second tube 18 from cracking due to air drafts during the rapid heating with the second heater element 40. The embodiment in FIG. 1 also is econimcal since it uses commercially available glass tubing rather than expensive custom glass envelopes.

Figure 2:
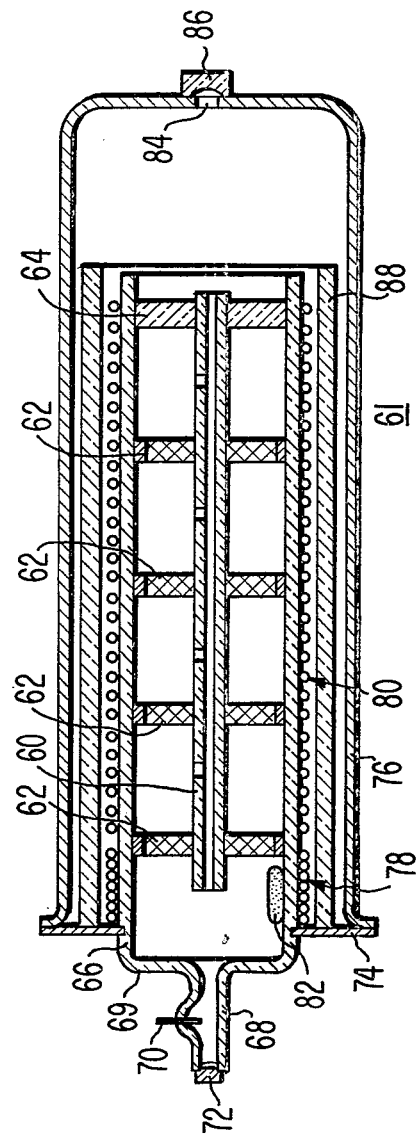
FIG. 2 shows an axial sectional view of an alternate embodiment of the laser discharge device.

An alternate embodiment is shown in FIG. 2 wherein a laser device 61 comprises a bore tube 60, a plurality of grid elements 62 and a plug 64 mounted within a second tube 66 in the same relationship as in the laser device 11 shown in FIG. 1. The second tube 66 has an end wall 69 from which a smaller tubular neck 68 outwardly extends in alignment with the bore tube 60. A mirror 72 is positioned over the free end of the neck 68. Protruding through the wall of the neck 68 is a pin shaped anode 70. A first heater element 78 is wrapped about the second tube 66 in the proximity of a source 82 of a metallic vapor such as cadmium. The vapor source 82 is located within the second tube 66 near the end wall 69. A second heater element 80 is wrapped around the portion of the second tube 66 which surrounds the bore tube 60. Attached to the exterior of the second tube 66, close to but spaced from the end wall 69, is a metal ring 74 encircling the second tube 66.

A metalic container 76, in the shape of a hollow cylinder, forms an envelope enclosing a substantial portion of the second tube 66. The metalic container 76 has one open end which is welded to the ring 74. The other end of the metalic container is closed and extends across the free end of the second tube 66, thereby enclosing both the heater elements 78 and 80. Both of the heater elements 78 and 80 are connected to a power supply by means of several leads (not shown) extending through the ring 74. The closed end of the metalic container 76 has an aperture 84 therethrough, which is aligned with bore tube 60. A spherical mirror 86 is attached over the aperture 84. The metalic container 76 also serves as a cathode during laser operation. An insulator 88 is between the heating elements 78 and 80, and the container 76, thermally insulating the container. The operation of the laser device 61 in FIG. 2 is the same as that of the laser device 11 in FIG. 1 except that the operating voltage in the laser device 61 of FIG. 2 is applied across the anode 70 and the metalic container 76.

What is claimed is:

1. A metal vapor laser discharge device which is responsive to a given operating voltage applied thereto for producing a discharge therein, said device comprising:
   a longitudinal bore tube having open ends;
   a second tube coaxially surrounding said bore tube and extending over at least the full length of said bore tube, said second tube comprising a hollow cylindrical portion coaxially surrounding said bore tube, a transverse end wall at one end of said cylindrical portion, and a tubular neck extending outwardly from said end wall;
   means for preventing vapor discharge in a region between said bore tube and said second tube;
   a metalic vapor source within said second tube;
   two electrodes positioned near opposite ends of said bore tube; and
   a gas filled envelope enclosing at least the portion of said second tube surrounding said bore tube, the one end of the cylindrical portion extending outside said envelope.

2. The device as in claim 1 wherein said envelope comprises a hollow metal cylinder, said cylinder has one open end attached to the cylindrical portion of the second tube near the transverse wall, the other end of the cylinder is closed and extends across the other end of said cylindrical portion of the second tube.

* * * * *